(12) United States Patent
Wehaus et al.

(10) Patent No.: US 7,231,865 B2
(45) Date of Patent: Jun. 19, 2007

(54) SWIVELING MOTOR

(75) Inventors: Holger Wehaus, München (DE);
Volker Middelmann,
Attenkirchen-Thalhamm (DE)

(73) Assignee: Thyssenkrupp Automotive AG,
Bochum (DE)

( * ) Notice: Subject to any disclaimer, the term of this patent is extended or adjusted under 35 U.S.C. 154(b) by 0 days.

(21) Appl. No.: 11/146,382

(22) Filed: Jun. 6, 2005

(65) Prior Publication Data

US 2005/0247053 A1    Nov. 10, 2005

(51) Int. Cl.
*F15B 13/044* (2006.01)
(52) U.S. Cl. .......................................... 91/422; 92/121
(58) Field of Classification Search ................. 91/422; 92/121
See application file for complete search history.

(56) References Cited

U.S. PATENT DOCUMENTS 5,261,316 A * 11/1993 Nishikawa et al. .......... 91/422

FOREIGN PATENT DOCUMENTS

DE            20307106        *   8/2003

* cited by examiner

*Primary Examiner*—F. Daniel Lopez
(74) *Attorney, Agent, or Firm*—Max Fogiel

(57) ABSTRACT

A swiveling motor for a divided stabilizer in an area of a vehicle axle, in which a housing is closed off in a region of its end surfaces by lids. A differential pressure regulating valve located coaxially with the housing and having at least one electromagnet, and two springs of different spring load deflection characteristics directed opposite to one another. One of these springs has a lower spring load deflection characteristic in a region of the electromagnet.

10 Claims, 2 Drawing Sheets

SWIVELING MOTOR

BACKGROUND OF THE INVENTION

The invention relates to a swiveling motor for a divided stabilizer in the region of a vehicle axle, comprising at least a housing, which is closed off in the region of its end surfaces by lids and accommodates a rotor as well as a valve.

The DE-A 19 754 539 discloses a swiveling motor for a divided stabilizer at a vehicle axle, including a cylinder, which is closed off at the ends by two lids, radial ribs extending axially at the internal diameter of the cylinder and a motor shaft with blades, which have the same axial extent as the ribs of the cylinder, the blades of the motor shaft and the ribs of the cylinder forming individual working chambers, as well as a connecting system between the working chambers, which has, in the swiveling motor, an on-off valve, which selects the connection between the individual working chambers in the sense of controlling the driving stability.

Only the starting and stopping states of the swiveling matter can be realized by this on-off valve. An active control is not possible. Such on-off valves require at least one valve block, in order to switch the swiveling motor on or off. As a result, more space is required in the peripheral region of the swiveling motor.

SUMMARY OF THE INVENTION

It is an object of the invention to develop a swiveling motor of the type indicated, so that the swiveling motor can be controlled actively for actively twisting the halves of a divided stabilizer, the space, required for the swiveling motor and it peripheral equipment being reduced at the same time.

Pursuant to the invention, this object is accomplished owing to the fact that the valve is a differential pressure regulating valve, which is disposed coaxially with the housing and has at least one magnet.

Further advantageous developments of the object of the invention are given in the dependent claims.

By means of the inventive swiveling motor with the internal differential pressure regulating valve, the halves of a divided stabilizer can actively be twisted hydraulically. Compared to the state of the art, a simplified design is brought about, while, at the same time, it is possible to control the swiveling motor actively.

It is of great advantage that, by integrating the differential pressure regulating valve coaxially in the swiveling motor, further components, such as valve blocks, pipelines, fastening elements and the like can be omitted, so that short hydraulic paths result with the therewith associated higher dynamics.

The differential pressure regulating valve includes a working gate valve, a magnetic tappet as well as, coaxially thereto, a sliding sleeve, which is provided axially between the working gate valve and the magnetic tappet. Without any magnetic force, the spring with the highest spring load deflection characteristic pushes the working gate valve in the direction of the magnetic tappet. After a specified path of, for example, 2 mm, the working gate valve carries along the sliding sleeve, which has been provided coaxially thereto, until said sliding sleeve, after a further, specifiable travel of, for example, 5 mm, comes to rest against a stop. In this position, the chambers A and B are closed off by the sleeve and P is connected with T. This position forms the fail-safe position, a position, which sets in automatically in the event of a failure of the operating systems and ensures a dynamically safe driving function of the stabilizer.

When the magnetic force is activated (for example, when the ignition is switched on) the magnetic tappet shifts the working gate valve against the force of the spring. The additional spring, provided in the region of the magnet, moves the sliding sleeve correspondingly until it comes to rest on the other side at a further stop. In this operating position, the sliding sleeve opens up the channel A and B and to P and T. Subsequently, the magnet pushes the working gate valve by a further specifiable amount, such as 2 mm, into the middle position. From here on, the magnet and the spring work against one another with the higher spring load deflection characteristic and, moreover, by a specifiable control element path, such as ±1.5 mm.

A very sensitive control, especially of the two halves of a divided stabilizer, can be realized with a swiveling motor of simple construction.

DESCRIPTION OF THE DRAWINGS

The object of the invention is described in the following and shown by means of an example, in the drawing, in which.

DETAILED DESCRIPTION OF THE INVENTION

Figure 1:
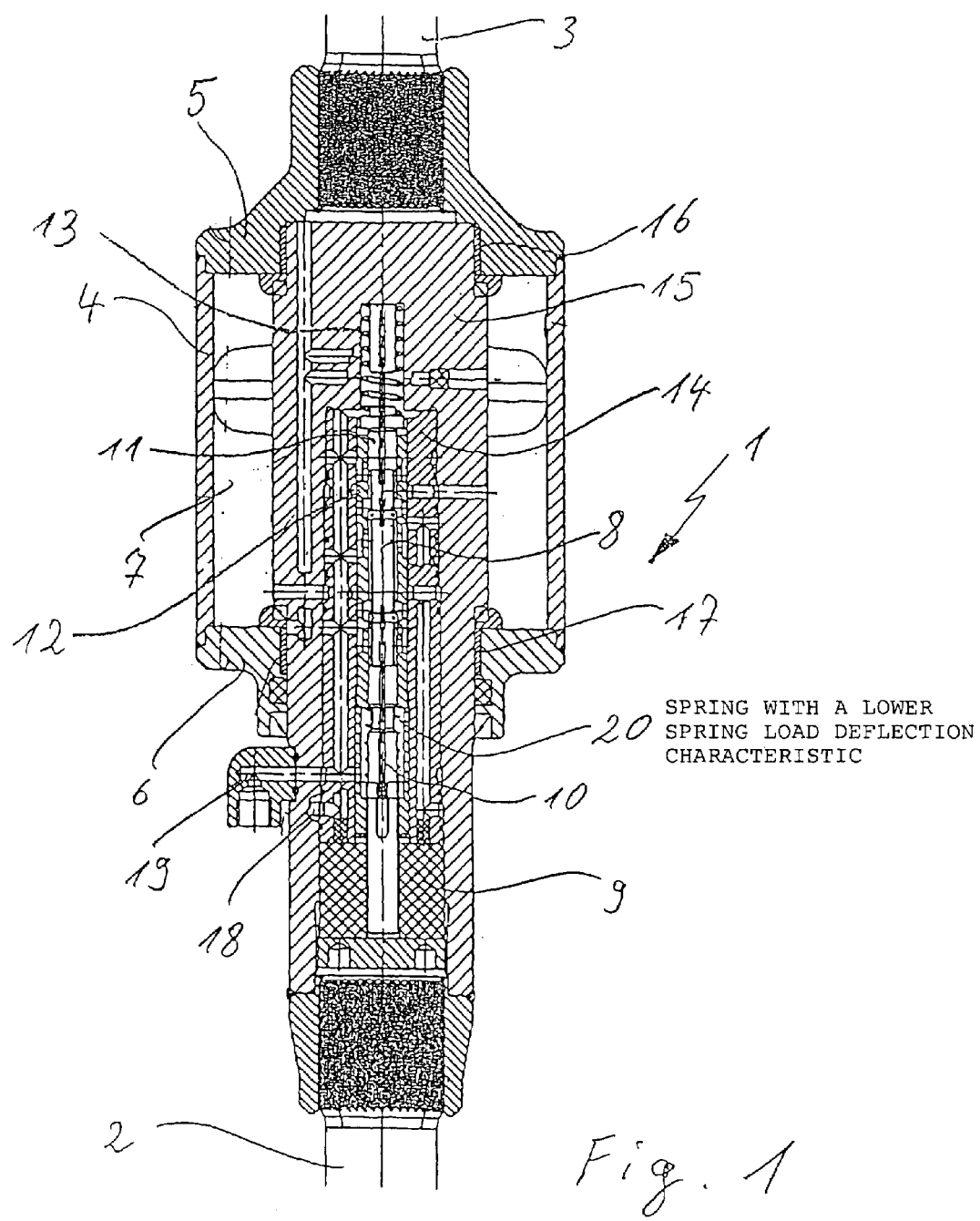
FIG. 1 shows a swiveling motor, containing a differential pressure regulating valve in the fail-safe position
Figure 2:
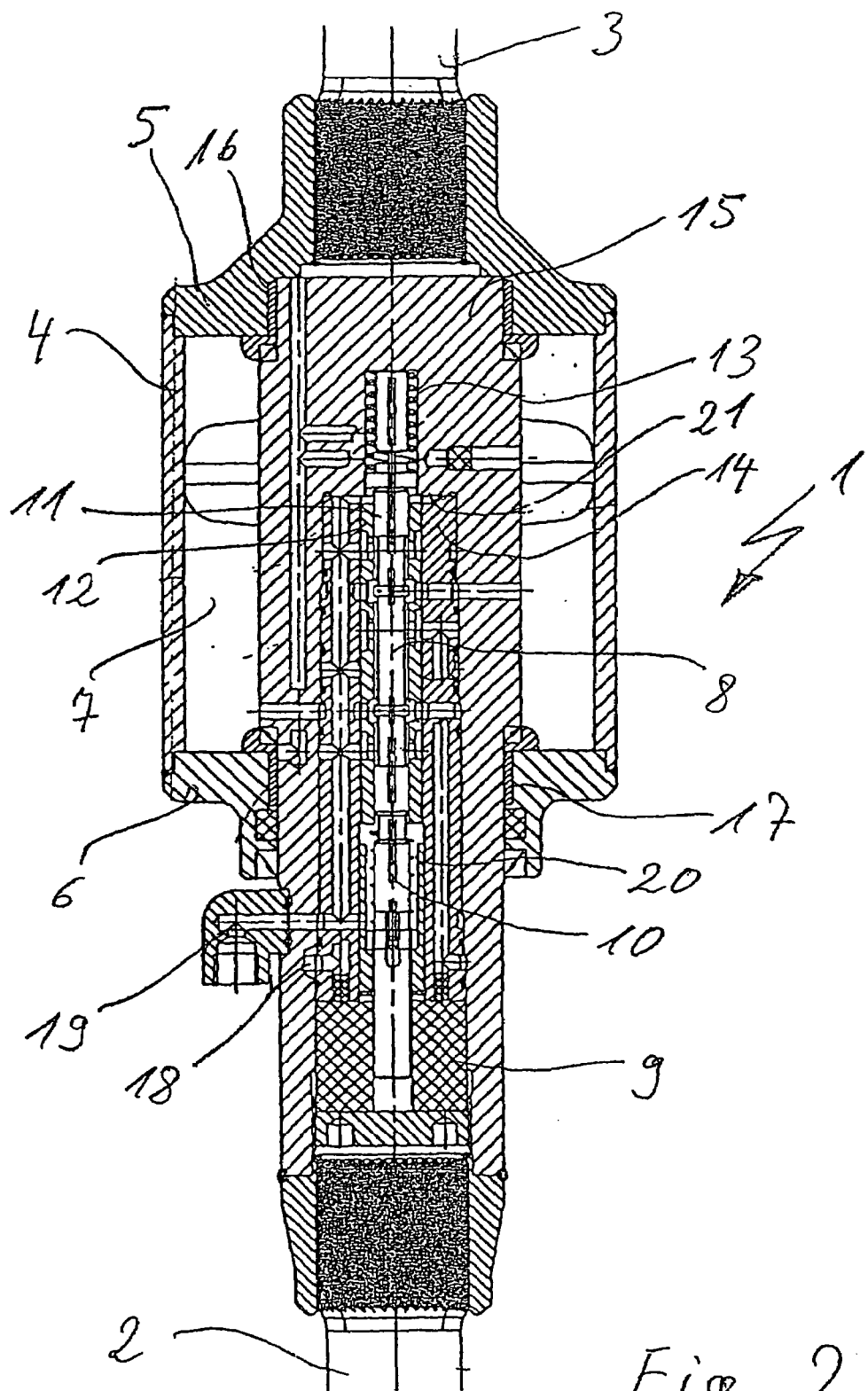
FIG. 2 shows a swiveling motor of FIG. 1 with a differential pressure regulating valve in the operating position.

In FIGS. 1 and 2, a swiveling motor 1 is described, which actively twists hydraulically the halves 2, 3, which are only indicated here, of a stabilizer, the further details of which are not shown. The swiveling motor 1 includes a housing 4, which is closed off in the region of its end surfaces by lids 5, 6. Chambers 7, which function as working chambers and contribute to controlling the driving stability, are provided within the housing 4.

A differential pressure regulating valve 8, which essentially has the following components, is disposed coaxially with the housing 4:

An electromagnet 9, a magnetic tappet 10, which is actuated by the electromagnet 9, a working gate valve 11, a sliding sleeve 12, a spring 13 as well as a cartridge insert 14. Within the housing 4, a rotor 15 is provided, which can rotate, for example, over sliding bearings 16, 17, relative to the housing 4. Furthermore, a pump connection 18, as well as a tank connection 19 are disposed outside of the housing 4. The magnetic tappet 10 is surrounded by a spring 20, the spring load deflection characteristic of which is less than that of spring 13.

FIG. 1 shows the fail-safe position of the swiveling motor 1 and FIG. 2 defines the operating position (for example, when the ignition of the internal combustion engine is switched on). The sliding sleeve 12 is disposed coaxially with the working gate valve 11. In the absence of a magnetic force, that is, in the fail-safe position of the swiveling motor, the spring 13 on the right, because of its higher spring load deflection characteristic, pushes the working gate valve 11 to the left and, moreover, in the direction of the electromagnet 9. After approximately 2 mm, the working gate valve 11, with its left guiding diameter, takes along the sliding sleeve 2 until the latter, after a further travel of 5 mm, also comes to rest on the left side. In this position, the chambers A and B are closed off by the sliding sleeve 12 and chamber P is connected with chamber T.

FIG. 2 shows the operating state of the swiveling motor 1. When the magnetic force is activated (for example, when the ignition is on), the magnetic tappet 10 pushes the working slide 11 against the force of the spring 13 to the right. The left spring 20 moves the sliding sleeve 12 correspondingly, until the latter comes to rest on the right side at the base of a stepped borehole 21 in the rotor 15. In this position, the sliding sleeve 12 opens up the normal channels to A and B and to P and T. Subsequently, due to the magnetic force of the electromagnet 9, the working gate valve 11 is moved by a further distance of, for example, 2 mm, to the right into a middle position. From here on, the electromagnet 9 and the right spring 13 worked against one another and, moreover, by an actuator path of, for example, ±1.5 mm.

LIST OF REFERENCE SYMBOLS 1 swiveling motor
2 half
3 half
4 housing
5 lid
6 lid
7 chambers
8 differential pressure regulating valve
9 electromagnet
10 magnetic tappet
11 working gate valve
12 sliding sleeve
13 spring
14 cartridge insert
15 rotor
16 sliding bearing
17 sliding bearing
18 pump connection
19 tank connection
20 spring
21 stepped borehole

The invention claimed is:

1. A swiveling motor for a divided stabilizer in an area of a vehicle axle, comprising: at least a housing closed off in a region of its end surfaces; lids for closing off said housing; a rotor and a valve in said housing; said valve comprising a differential pressure regulating valve located coaxially with said housing and having at least one electromagnet and two springs of different spring load deflection characteristics directed opposite to one another; one of said springs having a lower spring loads deflection characteristic in a region of said electromagnet.

2. The swiveling motor as defined in claim 1, including at least one axially movable component between said two springs for achieving different control states of said differential pressure regulating valve.

3. A swiveling motor as defined in claim 1, including a working gate valve, a sliding sleeve and a magnetic tappet between said two springs, said working gate valve moving said sliding sleeve coaxially to said working gate valve and over one of said springs free of magnetic force in a direction of an axially opposite one of said magnetic tappet.

4. The swiveling motor as defined in claim 3, wherein said working gate valve defines a state at rest upon being actuated exclusively by said one of said springs.

5. The swiveling motor as defined in claim 3, wherein said magnetic tappet of said working gate valve moves against force of said one of said springs in a direction of a starting position when said electromagnet is activated, the other one of said springs pushing said sliding sleeve to a specifiable end position.

6. The swiveling motor as defined in claim 3, wherein after said sliding sleeve has reached an end position, further axial displacement of said working gate valve can be achieved by said electromagnet for setting a working position.

7. The swiveling motor as defined in claim 3, wherein said magnetic tappet and said one of said springs can be moved against one another in a working position for achieving a specifiable actuator path of said working gate valve.

8. The swiveling motor as defined in claim 1, wherein said motor has a rotor, said differential pressure regulating valve being located within said rotor.

9. The swiveling motor as defined in claim 1, wherein said electromagnet is located outside said housing.

10. The swiveling motor as defined in claim 1, including a pump connection and a tank connection outside said housing.

* * * * *